United States Patent [19]

Slocum et al.

[11] Patent Number: 5,128,087

[45] Date of Patent: Jul. 7, 1992

[54] PROCESS FOR THE PRODUCTION OF MOLDED PRODUCTS USING INTERNAL MOLD RELEASE AGENTS

[75] Inventors: Gregory H. Slocum, Niskayuna, N.Y.; Donald W. Schumacher, Gurnee, Ill.

[73] Assignee: Miles Inc., Pittsburgh, Pa.

[21] Appl. No.: 679,453

[22] Filed: Apr. 2, 1991

Related U.S. Application Data

[63] Continuation-in-part of Ser. No. 490,857, Mar. 9, 1990, abandoned.

[51] Int. Cl.$^5$ .............................................. B29C 45/00
[52] U.S. Cl. .................................. 264/300; 252/182.2; 252/182.21; 252/182.26; 264/325; 264/328.6; 264/331.19; 521/130; 521/159; 524/322; 524/590; 528/48
[58] Field of Search ................... 264/51, 54, 300, 325, 264/328.6, 331.19; 106/38.22, 38.24; 252/182.2, 182.21, 182.26; 521/130, 159; 524/322, 590; 528/48

[56] References Cited

U.S. PATENT DOCUMENTS

| | | |
|---|---|---|
| 3,726,952 | 4/1973 | Boden et al. ........................ 264/48 |
| 3,993,606 | 11/1976 | von Bonin et al. .............. 264/300 X |
| 4,058,492 | 11/1977 | von Bonin et al. .................. 521/110 |
| 4,098,731 | 7/1978 | von Bonin et al. .................... 521/51 |
| 4,111,861 | 9/1978 | Godlewski .......................... 521/123 |
| 4,201,847 | 5/1980 | Kleimann et al. .................. 521/172 |
| 4,254,228 | 3/1981 | Kleinmann et al. ................ 521/128 |
| 4,499,254 | 2/1985 | Dominguez et al. ................ 528/49 |
| 4,801,623 | 1/1989 | Hess et al. ......................... 521/157 |
| 4,868,224 | 9/1989 | Harasin et al. ..................... 521/124 |
| 5,019,317 | 5/1991 | Slocum et al. ..................... 264/300 |

FOREIGN PATENT DOCUMENTS

| | | |
|---|---|---|
| 1276752 | 11/1990 | Canada . |
| 0119471 | 8/1984 | European Pat. Off. . |
| 262378 | 4/1988 | European Pat. Off. . |

*Primary Examiner*—Leo B. Tentoni
*Attorney, Agent, or Firm*—Joseph C. Gil

[57] ABSTRACT

The present invention is directed to a process for producing a molded product by a) reacting i) an organic polyisocyanate, ii) an hydroxyl group containing component having an average hydroxyl number of 300 or more, an average hydroxyl functionality of from 2 to 8, and an average molecular weight of no more than about 500, and iii) a carboxylic acid, in a closed mold, b) allowing the components to react, and c) removing the product from the mold.

7 Claims, No Drawings

PROCESS FOR THE PRODUCTION OF MOLDED PRODUCTS USING INTERNAL MOLD RELEASE AGENTS

CROSS REFERENCE TO RELATED APPLICATION

This application is a continuation-in-part of U.S. application Ser. No. 07/490,857, filed on Mar. 9, 1990, now abandoned.

BACKGROUND OF THE INVENTION

Internal mold release agents used in the production of molded polyurethane and polyurea products are known. U.S. Pat. Nos. 4,201,847 and 4,254,228 describe an internal mold release which is the reaction product of an organic polyisocyanate and an active hydrogen containing fatty acid ester. U.S. Pat. No. 4,111,861 describes four different classes of internal mold releases: i) mixtures of aliphatic or aryl carboxylic acids and polar metal compounds; ii) carboxyalkylsiloxanes; iii) aliphatic glyoximes; and, iv) aralkyl quaternary ammonium salts. Other known release agents include salts of acids (such as oleic acid) and primary amines (see, U.S. Pat. No. 3,726,952), reaction products of long chain fatty acids and ricinoleic acid (see, U.S. Pat. No. 4,058,492), and salts of acids (such as oleic acid) and tertiary amines (see, U.S. Pat. No. 4,098,731).

Release agents containing zinc carboxylates in combination with primary or secondary amine compatibilizers and an organic material containing a carboxylic acid group, a phosphorous containing acid group or a boron containing acid group, are described in published European Patent Application 0,119,471.

Most recently, a system which provides release from a bare metal mold has been developed. The system utilizes the reaction product of an organic polyisocyanate and an active hydrogen containing fatty acid ester in the A-side and a zinc carboxylate in the B-side (see, U.S. Pat. No. 4,868,224). One problem with this system is that the zinc carboxylate/solubilizer combination catalyzes the hydroxyl/isocyanate reaction. This makes the system relatively fast, leading to difficulties in filling large molds.

It is known to add fatty acids to polyurea systems in order to increase the green strength and aid in mold release (see, U.S. Pat. No. 4,499,254).

DESCRIPTION OF THE INVENTION

The present invention is directed to an improvement over the process described above which utilizes an isocyanate/ carboxylic acid ester reaction product and zinc carboxylate combination. The reactivity of the overall system is reduced. At the same time, the system will release from a bare metal mold. More particularly, the present invention is directed to a process for producing a molded product comprising:

A) reacting
 i) an organic polyisocyanate having an isocyanate group content of from 5 to 45% by weight, preferably from 15 to 35% by weight, and most preferably from 20 to 35% by weight,
 ii) a hydroxyl group containing component, said component having a) an average hydroxyl number of at least 300, preferably from about 300 to about 1800 and most preferably from about 400 to about 1200, b) an average hydroxyl functionality of from 2 to 8, and c) an average molecular weight of no more than about 500, and
 iii) from about 0.1 to about 10% by weight, based on the combined weight of components i), ii), and iii) of a carboxylic acid, at an isocyanate index of from about 90 to about 400 and preferably from about 95 to about 115, in a closed mold, B) allowing the components to react in said mold to form said product, and C) removing the product from the mold.

The reaction of components i), ii) and iii) is conducted in the substantial absence of:

1) salts of a) aliphatic carboxylic acids and b) either a primary amine or an amine which contains either amide or ester groups,
2) salts of a) fatty acids and b) polysiloxanes which contain amino groups,
3) reaction products of a long chain fatty acid and ricinoleic acid, and
4) salts of a) carboxylic acids containing at least 8 carbon atoms and b) tertiary amines in which the atom ratio of tertiary amine nitrogen to carbon in the molecule is between 1:3 and 1:12.

The various materials to be excluded are known and described in the art. The salts 1) are described in U.S. Pat. 3,726,952; the salts 2) are described in U.S. Pat. No. 3,993,606; the reaction products 3) are described in U.S. Pat. No. 4,058,492; and, the salts 4) are described in U.S. Pat. No. 4,098,731.

It has been found that this particular combination of materials gives excellent release from a variety of different mold surfaces. It has been found that release from a bare metal mod, such as steel or aluminum, is possible without any pre-application of external mold release agent to the mold surface.

Essential to the present invention is the carboxylic acid. Useful acids include both saturated or unsaturated carboxylic acids. Preferred are aliphatic acids such as octane carboxylic acids, dodecane acids, natural fatty acids such as ricinoleic acid, oleic acid, alaidic acid, stearic acid, palmitic acid, linoleic acid, linolenic acid, train oil fatty acids, fatty acids obtained from coconut oil, tallow fatty acids or fatty acids obtained by paraffin oxidation, tall oil fatty acids, succinic acid, maleic acid, citric acid, azelaic acid, adipic acid or higher dicarboxylic and polycarboxylic acids, oligomerization products of unsaturated carboxylic acids and addition products of maleic acid with natural and synthetic oils, and the like. The following are particularly suitable: oleic acid, linoleic acid, ricinoleic acid and adipic acid. Also useful are those fatty acids represented by the formula: $R(CO_2H)n$, where n is 1,2, or 3, and where R contains at least 8 carbon atoms. R may be alkyl (cyclic, linear or branched), alkaryl, aralkyl, or aryl, saturated or unsaturated. Examples of useful acids include n-decanoic acid, neodecanoic acid, sebacic acid, undecanoic acid, dodecanoic acid, lauric acid, palmitic acid, stearic acid, isostearic acid, oleic acid, linoleic acid, and the like. The acid can be mixed with either the hydroxyl component or the isocyanate component prior to use. The relative amounts of acid used are as described above.

Starting polyisocyanate components include aliphatic, cycloaliphatic, aralphatic, aromatic and heterocyclic polyisocyanates of the type described, for example, by W. Siefken in Justus Liebigs Annalen der Chemie, 562, pages 72 to 136. Specific examples of these compounds are ethylene diisocyanate; 1,4-tetramethylene diisocyanate; 1,6-hexamethylene diisocyanate;

1,12-dodecane diisocyanate; cyclobutane-1,3-diisocyanate; cyclohexane-1,3- and 1,4-diisocyanate and mixtures of these isomers. Additional examples are 1-isocyanato-3,3,5-trimethyl-5-isocyanatomethyl cyclohexane (German Auslegeschrift No. 1,202,785, U.S. Pat. No. 3,401,190), 2,4- and 2,6-hexahydro-tolylene diisocyanate and mixtures of these isomers. Hexahydro-1,3- and/or -1,4-phenylene perhydro-2,4'- and/or -4,4'-diphenylmethane diisocyanate; 1,3- and 1,4-phenylene diisocyanate; 1,4- and 2,6-tolylene diisocyanate and mixtures of these isomers are also suitable in the instant invention. Diphenylmethane-2,4-and/or -4,4'-diisocyanate; naphthylene1,5-diisocyanate; triphenyl methane-4,4',4"-triisocyanate; polyphenyl polymethylene polyisocyanates of the type obtained by condensing aniline with formaldehyde, followed by phosgenation and described, for example, in British Patent Nos. 874,430 and 848,671 may also be used in the present invention; m- and p-isocyanato-phenylsulfonyl isocyanates according to U.S. Pat. No. 3,454,606; perchlorinated aryl polyisocyanates of the type described, for example, in German Auslegeschrift No. 1,157,601 (U.S. Pat. No. 3,277,138); polyisocyanates containing carbodiimide groups of the type described in German Patent No. 1,902,007 (U.S. Pat. No. 3,152,162); diisocyanates of the type described in U.S. Pat. No. 3,492,330; and polyisocyanates containing allophanate groups of the type described, for example, in British Patent No. 993,890, in Belgian Patent No. 761,626 and in published Dutch Patent Application No. 7,102,524 are still further examples of suitable isocyanates. Additionally, polyisocyanates containing isocyanurate groups of the type described, for example, in U.S. Pat. No. 3,001,973; in German Patent Nos. 1,022,789; 1,222,067 and 1,027,394 and in German Offenlegungsschriften Nos. 1,929,034 and 2,004,408; polyisocyanates containing urethane groups of the type described, for example, in Belgian Patent No. 752,261 or in U.S. Pat. No. 3,394,164; polyisocyanates containing acylated urea groups according to German Patent No. 1,230,778 and polyisocyanates containing biuret groups of the type described, for example, in German Patent No. 1,101,394 (U.S. Pat. Nos. 3,124,605 and 3,201,372) and in British Patent 889,050 are also suitable.

Polyisocyanates produced by telomerization reactions of the type described, for example, in U.S. Pat. No. 3,654,106; polyisocyanates containing ester groups of the type described for example, in British Patents 965,474 and 1,072,956, in U.S. Pat. No. 3,567,763 and in German Patent 1,231,688; reaction products of the above-mentioned isocyanates with acetals according to German Patent No. 1,072,385 and polyisocyanates containing polymeric fatty acid residues, according to U.S. Pat. No. 3,455,883 are still further examples of suitable isocyanate.

Aromatic polyisocyanates which are liquid at the processing temperature are preferably used. The particularly preferred starting polyisocyanates include derivatives of 4,4'-diisocyanato-diphenylmethane which are liquid at room temperature, for example, liquid polyisocyanates containing urethane groups of the type obtainable in accordance with German Patent No. 1,618,380 (U.S. Pat. No. 3,644,457). These may be produced for example, by reacting 1 mol of 4,4,'-diisocyanato-diphenylmethane with from 0.05 to 0.3 mols of low molecular weight diols or triols, preferably polypropylene glycols having a molecular weight below 700. Also useful are diisocyanates based on diphenylmethane diisocyanate containing carbodiimide and/or uretone imine groups of the type obtainable, for example, in accordance with German Patent No. 1,092,007 (U.S. Pat. No. 3,152,162). Mixtures of these preferred polyisocyanates can also be used. In general, aliphatic and cycloaliphatic isocyanates are less suitable for the purposes of the instant invention.

Also preferred are the polyphenyl-polymethylene polyisocyanates obtained by the phosgenation of an aniline/formaldehyde condensate. Where reinforcing fiber mats are used, it is particularly preferred that such polyisocyanates have viscosities of 200 mPa.s or less at 25° C.

Also necessary for preparing the molded product of the present invention is a hydroxyl group containing material. As noted above, the hydroxyl material must have an average hydroxyl number of at least 300, must have an average hydroxyl functionality of from 2 to 8, and preferably from 2 to 4, and must have a molecular weight of no more than about 500. Examples of suitable compounds include the polyesters, polyethers, polythioethers, polyacetals and polycarbonates containing 2 to 8 hydroxyl groups of the type known for the production of polyurethanes.

The polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of $BF_3$ or by chemically adding these epoxides, preferably ethylene oxide and propylene oxide, in admixture or successively to components containing reactive hydrogen atoms such as water, alcohols or amines. Examples of alcohols and amines include the low molecular weight chain extenders set forth hereinafter, 4,4'-dihydroxy diphenyl propane, sucrose, aniline, ammonia, ethanolamine and ethylene diamine.

Suitable examples of polyesters include the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above identified U.S. patents. Finally, representatives of the many and varied compounds which may be used in accordance with the invention may be found for example in High Polymers, Volume XVI, "Polyurethanes, Chemistry and Technology," by Saunders-Frisch, Interscience Publishers, New York, London, Vol. I, 1962, pages 32-42 and 44-54, and Volume II, 1964, pages 5-6 and 198-199; and in Kunststoff-Handbuch, Vol. VII, Vieweg-Hochtlen, Carl Hanser Verlag, Munich, 1966, pages 45-71.

The hydroxyl group containing materials also include materials which are typically used as chain extenders in polyurethane chemistry. Examples of such materials include ethylene glycol, 1,2- and 1,3-propane diol, 1,3- and 1,4- and 2,3-butane diol, 1,6-hexane diol, 1,10-decane diol, diethylene glycol, triethylene glycol, tetraethylene glycol, dipropylene glycol, tripropylene glycol, glycerol and trimethylol propane.

Higher molecular weight materials can also be used provided that the mixture of hydroxyl materials has the average hydroxyl number, functionality and molecular weight noted above.

It is particularly preferred to utilize the hydroxyl group containing composition described in U.S. Pat. No. 4,792,576, so long as the various average values noted above are met.

Other additives which may be used in the present invention include catalysts, especially tin(II) salts of carboxylic acids, dialkyl tin salts of carboxylic acids, dialkyl tin mercaptides, dialkyl tin dithioesters and tertiary amines. Preferred among these catalysts are dibutyl tin dilaurate and 1,4-diazabicyclo-(2,2,2)-octane (triethylene diamine), especially mixtures of these catalysts. The catalysts are generally used in amounts of about 0.01 to 10%, preferably about 0.05 to 2%, based on the weight of the isocyanate reactive component.

It is also possible to use surface-active additives such as emulsifiers and foam stabilizers. Examples include N-stearyl-N',N'-bis-hydroxyethyl urea, oleyl polyoxyethylene amide, stearyl diethanol amide, isostearyl diethanol amide, polyoxyethylene glycol monoleate, a pentaerythritol/adipic acid/oleic acid ester, a hydroxy ethyl imidazole derivative of oleic acid. N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described in U.S. Pat. No. 2,764,565. In addition to the catalysts and surface-active agents, other additives which may be used in the molding compositions of the present invention include known blowing agents, cell regulators, flame retarding agents, plasticizers, dyes, fillers and reinforcing agents such as glass in the form of fibers or flakes or carbon fibers.

The molded products of the present invention are prepared by reacting the components in a closed mold. The compositions according to the present invention may be molded using conventional processing techniques at isocyanate indexes ranging from as low as 90 to as high as 400 (preferably from 95 to 115) and are especially suited for processing by the RIM process. In general, two separate streams are intimately mixed and subsequently injected into a suitable mold, although it is possible to use more than two streams. The first stream contains the polyisocyanate component and can contain the acid, while the second stream contains the hydroxyl component, and contains the acid (where the acid is not included with the isocyanate) and any other additives which are to be included.

The invention is further illustrated but is not intended to be limited by the following examples in which all parts and percentages are by weight unless otherwise specified.

EXAMPLES

In the examples which follow, the following materials were used:

ACID A: a commercially available mixture of organic acids containing about 90% by weight of myristic acid, available from Witco Corporation as Hystrene 9014.

ACID B: a commercially available mixture of organic acids containing about 33% by weight of oleic acid, about 35% by weight of linoleic acid, and about 20% of linolenic acid, available from Witco Corporation as Industrene 224.

ACID C: a commercially available mixture of organic acids containing about 70% by weight of oleic acid and 10% by weight of linoleic acid, available from Witco Corporation as Industrene 105.

POLYOL A: a 356 molecular weight ethylene diamine/propylene oxide adduct.

POLYOL B: a 425 molecular weight polypropylene glycol.

POLYOL C: a 165 molecular weight polyethylene glycol.

EG: ethylene glycol.

33LV: a 33% solution of triethylene diamine in dipropylene glycol.

610: Polycat SA 610-50, an amine catalyst available from Air Products.

ISO: a polymethylene polyol (phenyl isocyanate) containing about 58% by weight of diisocyanate, having a vicosity at room temperature of about 50 cps, and having an NCO content of about 32% by weight.

PREPOLYMER: 85.9 parts by weight of ISO were mixed with 14.1 parts of a glycerin initiated propylene oxide/ethylene oxide adduct having 90% primary hydroxyl termination and an hydroxyl number of about 28. The mixture was stirred for about 30 minutes at room temperature. The resultant prepolymer had an equivalent weight of 151, and a viscosity at room temperature of 180 cps.

Example 1

A B-side was prepared by mixing 50 parts of POLYOL-B, 30 parts of EG, 20 parts of POLYOL A, 1 part of 33LV, 0.5 part of 610, and 5 parts of ACID B. The A-side consisted of PREPOLYMER. This system was run on a Hennecke HK-245 RIM machine with a 10 mm Kraus Maffei mixhead. Material temperatures were 32° to 45° C. A-side and B-side impingement ratio (A/B) was 217/100 The system was injected into a 38 cm by 51 cm by 0.3 cm plaque tool heated to 66° C., which had previously been cleaned on one surface with an N-methyl pyrrolidone mold cleaner and which contained 0.09 g/cm$^2$ OCF M8610 continuous strand mat. The part was allowed to cure for two minutes after which the tool was opened. When removed by hand, the part released as easily from the cleaned surface as from the surface sprayed with a wax-based release agent (ChemTrend CT 2006).

Example 2

A PREMIX was prepared by adding 2 parts by weight ACID-A to 3 parts by weight of POLYOL A. The powdered ACID A was dissolved by heating the mixture to 121° C. and stirring. B-side was then prepared by mixing 50 parts by weight of POLYOL-B, 30 parts of EG, 12.5 parts of POLYOL A, 2 parts of 33LV, 0.5 parts of 610, and 12.5 parts of PREMIX (cooled to ambient temperature). The A-side consisted of ISO. This system was run on a Hennecke RIMDOMAT RIM machine with an Hennecke MS mixhead. The temperature of both sides were ambient and the temperature of the 0.3 cm thick mold used in Example 1 was 77° C. The A-side and B-side impingement pressure were both set at 100 bar. The mix ratio by weight was (A/B) 188/100. The system was injected into the tool which contained 0.09 gm/cm$_2$ M8610 glass mat. One tool surface had been cleaned with an N-methyl pyrrolidone mold cleaner. The other had been sprayed with a wax based mold release (ChemTrend CT-2006). After 60 seconds the part was demolded and released well from both surfaces.

Example 3

In order to determine if the interaction between the acid and POLYOL A in the PREMIX of the previous example had an effect on the usefulness of the acid as an internal release, another B-side was made by dissolving 5 parts by weight of ACID A in 50 parts of POLYOL B by heating to 121° C., cooling to ambient temperature (yielding a stable solution), adding 30 parts of EG, 20 parts of POLYOL A, and 1 part of 33LV. A 15×15×0.3 cm handcast tool was prepared by stripping one surface with mold cleaner and wiping a paste wax (ChemTrend RCT-B2080) on the other surface. The mold was heated to 68° C. and 0.06 gm/cm$^2$ M8608 glass mat was placed on the bottom cavity. 30 grams of B-side were mixed by manual stirring in a cup with 56 grams of ISO. The mixture was poured onto the glass mat and the mold was closed and clamped shut. After 2 minutes the mold was opened, and although the part released preferentially from the waxed surface, it released easily from the clean surface.

Example 4

A B-side was made by mixing 100 parts by weight of POLYOL C, 5 parts of ACID C, and 1.3 parts of 33LV. The A-side was ISO. 50 grams of B-side was mixed by stirring in a cup with 80 grams of ISO. The mixture was poured into a 15×15×0.3 cm plaque tool heated to 68° C., containing 0.06 gm/cm$^2$ M8608 continuous strand glass mat. One surface of the mold had been cleaned with a N-methyl pyrrolidone based mold cleaner. The other cavity was wiped with a paste wax mold release (ChemTrend RCT-B2080). After 7 minutes the mold was opened. The panel released from the stripped surface easily. The two sides were again mixed by stirring in a cup and about 5 grams of the mixture was poured onto the surface of a mold heated to 68° C. The resin was observed to gel in 1 minute and 55 seconds.

Example 5 (comparative)

A B-side was made by mixing 100 parts by weight of POLYOL C and 1.3 parts of 33LV. The A-side was ISO. 50 grams of B-side were mixed with 82.5 grams of A-side by stirring in a cup. One surface of a 15 by 15 by 0.3 cm plaque mold was cleaned with an N-methylpyrrolidone based mold cleaner, and the mold was heated to 56° C. About 5 grams of the mixture was poured onto the cleaned surface. The resin gel led in 35 seconds. The plaque did not release from the cleaned surface.

Example 6

A B-side was made by mixing 50 parts by weight of POLYOL B, 30 parts of EG, 20 parts of POLYOL A, and 0.5 parts of 33LV. An A-side was made by adding 5.3 parts of ACID B to 100 parts of ISO and heating the mixture to 71° C. Both surfaces of a 15 by 15 by 0.3 cm plaque mold were cleaned with an N-methylpyrrolidone-based mold cleaner. The mold was heated to 54° C. 50 parts of B-side were mixed with 105 parts of A-side by stirring in a cup. The mixture was poured into the mold and allowed to react for three minutes, at which time it was demolded. The part released easily.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing a molded product comprising:
    A) reacting:
        i) an organic polyisocyanate having an isocyanate group content of from 5 to 45% by weight,
        ii) a hydroxyl-group containing component, said component having a) an average hydroxyl number of at least 300, b) an average hydroxyl functionality of from 2 to 8, and c) an average molecular weight of no more than about 500, and
        iii) from about 0.1 to about 10% by weight, based on the combined weight of components i), ii), and iii) of a carboxylic acid, at an isocyanate index of from about 90 to about 400 in a closed mold,
    said reaction being conducted in the absence of:
        1) salts of a) aliphatic carboxylic acids and b) either a primary amine or an amine which contains either amide or ester groups,
        2) salts of a) fatty acids and b) polysiloxanes which contain amino groups,
        3) reaction products of a long chain fatty acid and ricinoleic acid, and
        4) salts of a) carboxylic acids containing at least 8 carbon atoms and b) tertiary amines in which the atom ratio of tertiary amine nitrogen to carbon in the molecule is between 1:3 and 1:12,
    B) allowing the components to react, and
    C) removing the product from the mold.

2. The process of claim 1, wherein component ii) has an average hydroxyl number of from about 300 to about 1800.

3. The process of claim 1, wherein component ii) has an average hydroxyl functionality of from 2 to 4.

4. The process of claim 1, wherein said carboxylic acid iii) is an aliphatic fatty acid.

5. The process of claim 1 wherein said carboxylic acid iii) is selected from the group consisting of oleic acid, linoleic acid, ricinoleic acid and adipic acid.

6. The process of claim 1, wherein said carboxylic acid iii) is a fatty acid of the formula: $R(CO_2H)n$, where n is 1, 2, or 3, and where R contains at least 10 carbon atoms.

7. The process of claim 1, wherein said index is from about 95 to about 115.

* * * * *